United States Patent
Soo

(10) Patent No.: US 7,609,708 B2
(45) Date of Patent: Oct. 27, 2009

(54) DYNAMIC BUFFER CONFIGURATION

(75) Inventor: Choon Yip Soo, Penang (MY)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 11/243,366

(22) Filed: Oct. 4, 2005

(65) Prior Publication Data

US 2007/0076735 A1   Apr. 5, 2007

(51) Int. Cl.
*H04L 12/28* (2006.01)
*H04L 12/56* (2006.01)
*G06F 13/00* (2006.01)
*G06F 13/28* (2006.01)

(52) U.S. Cl. ...................... 370/412; 711/153
(58) Field of Classification Search ............... 370/412
See application file for complete search history.

(56) References Cited

U.S. PATENT DOCUMENTS 6,317,427 B1 * 11/2001 Augusta et al. ............. 370/357
2005/0030893 A1 * 2/2005 Dropps et al. .............. 370/229

OTHER PUBLICATIONS

"Intel I/O Processors Based on Intel XScale Technology: Single Chip Processor, Validated Chipset and Standalone Core", *Copyright 2003 Intel Corporation*, (2003), 8 pages.

* cited by examiner

*Primary Examiner*—William Trost, IV
*Assistant Examiner*—Andrew Chriss
(74) *Attorney, Agent, or Firm*—Caven & Aghevli LLC

(57) ABSTRACT

Techniques that may be utilized in various computing environments are described. In one embodiment, a buffer is configured dynamically, e.g., during runtime. Other embodiments are also disclosed.

21 Claims, 6 Drawing Sheets

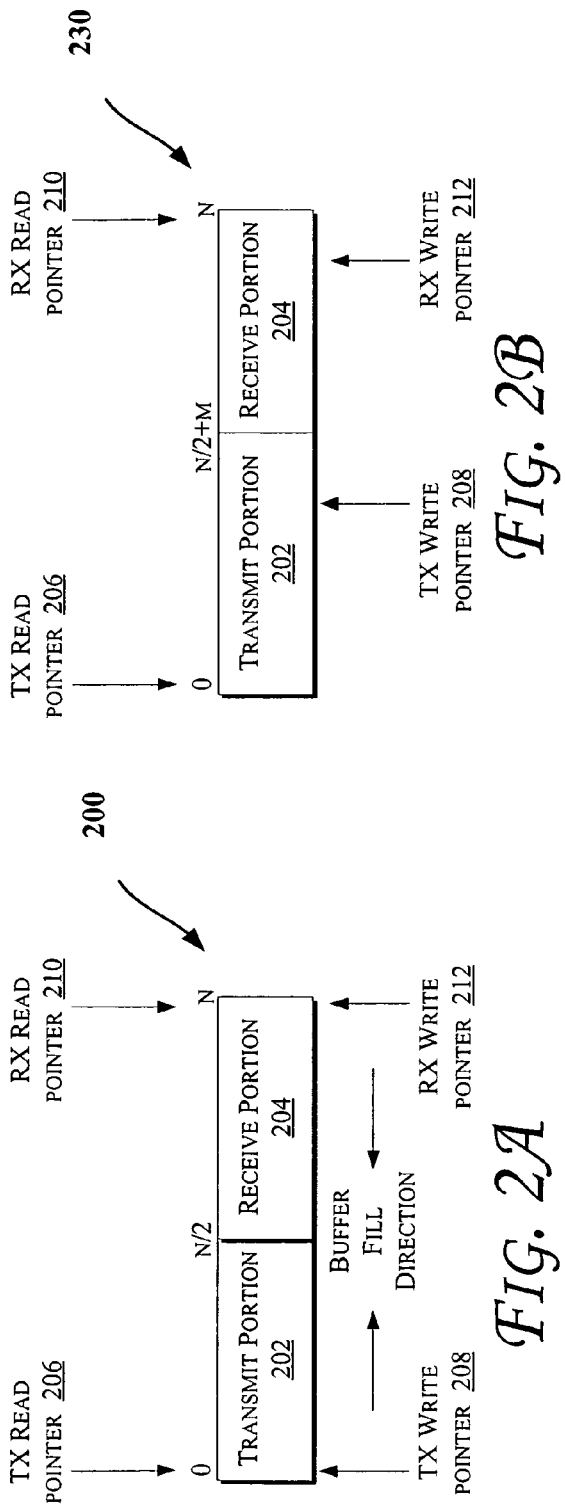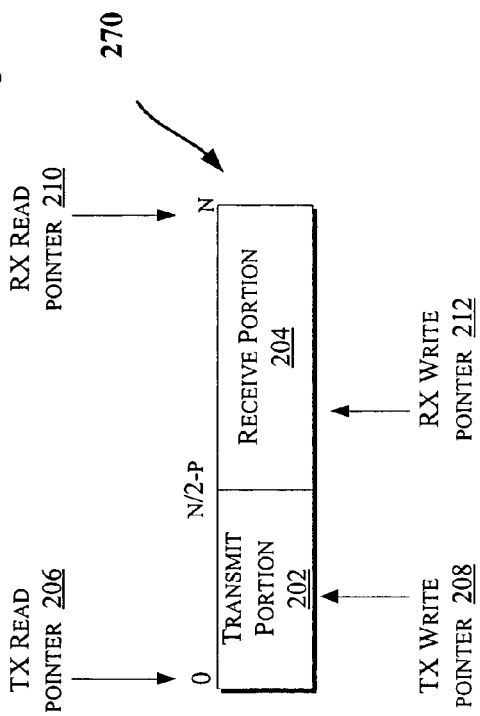
FIG. 2A
FIG. 2B
FIG. 2C

DYNAMIC BUFFER CONFIGURATION

BACKGROUND

Buffers are generally used to store data on a temporary basis. For example, as a computing device receives data from a computer network, the computing device may store the received data in a buffer. The stored data may later be retrieved for processing or transmission. Some computing devices have access to a limited amount of storage that may be utilized as a buffer.

Generally, a buffer may have a fixed size or a size that is configurable at programming time. As data traffic rates may be unpredictable, one buffer may be filled up more quickly than other buffers. In case of fixed size buffers, larger buffer sizes may be assigned during hardware design stage, but this may be an inefficient use of available resources such as silicon real-estate. For buffers that are configurable at programming time, the computing device may need to be reprogrammed (or reset) before the new buffer sizes can take effect. This may result in loss of data or halting of current operations that are pending execution on the computing device.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 2A, 2B, and 2C illustrate various embodiments of a buffer.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1:
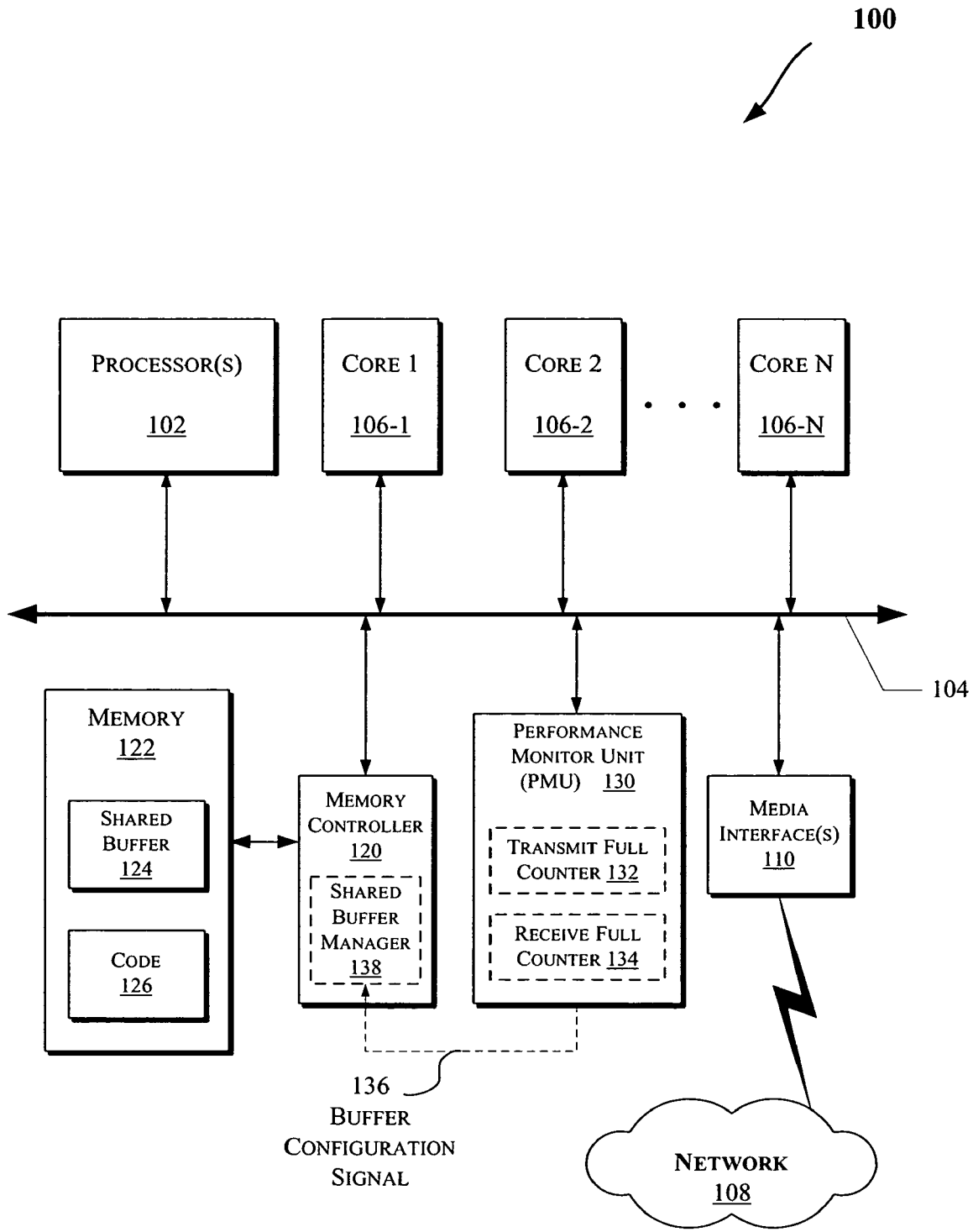
FIG. 1 illustrates a block diagram of portions of multiprocessor system, in accordance with an embodiment.

Techniques discussed herein with respect to various embodiments may provide for dynamic buffer configuration or partitioning, e.g., to improve queuing performance during runtime. These techniques may be utilized in various computing systems such as those discussed with reference to FIGS. 1 and 4 through 6. More particularly, FIG. 1 illustrates a block diagram of portions of a multiprocessor system 100, in accordance with an embodiment of the invention. The system 100 includes one or more processor(s) 102. The processor(s) 102 may be coupled through a bus (or interconnection network) 104 to other components of the system 100, such as one or more processor cores (106-1 through 106-N). Any suitable processor such as those discussed with reference to FIGS. 5 and/or 6 may comprise the processor cores (106) and/or the processor(s) 102. Also, the processor cores 106 and/or the processor(s) 102 may be provided on the same integrated circuit die. Further, even though FIG. 1 illustrates a single bus (104), the system 100 may include more than one bus. For example, the bus 104 may include other buses or interconnection networks. Additionally, select components of the system 100 may be coupled to a bus or interconnection network that communicates with the bus 104 via one or more bridges and/or other buses. In one embodiment, the system 100 may process data communicated through a computer network (108). In an embodiment, the processor cores (106) may be, for example, one or more microengines (MEs) and/or network processor engines (NPEs). Additionally, the processor(s) 102 may be a core processor (e.g., to perform various general tasks within the system 100). In an embodiment, the processor cores 106 may provide hardware acceleration related to tasks such as data encryption or the like.

The system 100 may additionally include one or media interfaces 110 (e.g., in the network interface 105 in one embodiment) that are coupled to the network 108 to provide a physical interface for communication with the network 108 through the bus 104. In an embodiment, the system 100 may include a media interface (110) coupled to each of the processor cores 106 (not shown). As will be further discussed with reference to FIG. 3, various components of the system 100 may be utilized to transmit and/or receive data communicated over the network 108.

As shown in FIG. 1, the system 100 may also include a memory controller 120 that is coupled to the bus 104. The memory controller 120 may be coupled to a memory 122 which may be accessed and shared by the processor(s) 102, the processor cores 106, and/or other components coupled to the bus 104. The memory 122 may store data and/or sequences of instructions that are executed by the processor(s) 102 and/or the processor cores 106, or other device included in the system 100. For example, the memory 122 may store data corresponding to one or more data packets communicated over the network 108 and/or data communicated between various components of the system 100 (such as data communicated between one or more of the processor(s) 102 and/or cores 106). Such data may be stored in one or more shared buffers 124 within the memory 122, as will be further discussed with reference to FIGS. 2A through 2C. The buffer 124 may be a first-in, first-out (FIFO) buffer or queue. Also, the memory 122 may store code 126 including instructions that are executed by the processor(s) 102 and/or the processor cores 106.

In an embodiment, the memory 122 may include one or more volatile storage (or memory) devices such as those discussed with reference to FIG. 5. Moreover, the memory 122 may include nonvolatile memory (in addition to or instead of volatile memory) such as those discussed with reference to FIG. 5. Hence, the system 100 may include volatile and/or nonvolatile memory (or storage). Additionally, multiple storage devices (including volatile and/or nonvolatile memory) may be coupled to the bus 104.

As shown in FIG. 1, the system 100 may further include a performance monitor unit (PMU) 130, for example, to track select hardware events within the system 100 and/or analyze performance of the system 100. The PMU 130 is coupled to the bus 104 and may monitor transactions that are communicated via the bus 104. The PMU 130 may include one or more programmable counters such as a transmit full counter 132 and a receive full counter 134 corresponding to the shared buffer 124, which will be further discussed with reference to FIG. 3. The counters 132 and 134 may be provided in any suitable location within the system 100, such as shown in FIG. 1, or as a variable stored in shared memory (e.g., in the memory 122). Also, the counters 132 and 134 may be hardware registers in an embodiment. The PMU 130 may communicate a buffer configuration signal 136 to a shared buffer manager 138. Alternatively, the signal 136 may be communicated via the bus 104. As will be further discussed with reference to FIG. 3, the shared buffer manager 138 may configure the size of select portions of the shared buffer 124 in response to commands and/or signals from the PMU 130. Also, the location of the PMU 130 and the shared buffer manager 138 shown in FIG. 1 is optional and these components may be provided in any suitable location within the system 100, such as within the processor(s) 102.

FIGS. 2A, 2B, and 2C illustrate various embodiments of a shared buffer, such as the shared buffer 124 of FIG. 1. More specifically, FIG. 2A illustrates an embodiment of a shared buffer 200 with a transmit portion 202 and a receive portion 204. In an embodiment, the transmit and receive portions (202 and 204, respectively) may be configured as FIFO buffers or queues, e.g., by utilizing read and write (or head and tail) pointers (206-212). For example, data received (e.g., from the network 108 of FIG. 1 or one or more of the processor(s) 102 and/or cores 106) may be stored in the receive portion 204 and data transmitted (e.g., from the network 108 of FIG. 1 or one or more of the processor(s) 102 and/or cores 106) may be stored in the transmit portion 202. As shown in FIG. 2A, the buffer 200 (e.g., at initialization) may be equally divided between the transmit portion 202 and receive portion 204, for example, each having a size of N/2. The buffer 200 may be initialized to other values. For example, a larger size may be assigned to the receive portion in implementations where more data is received than transmitted and vice versa. Also, as illustrated in FIG. 2A, the buffer 200 may be filled from the outside towards the center of the buffer 200 in an embodiment. Hence, the transmit portion 202 and the receive portion 204 may be contiguous (or otherwise logically adjacent) in an embodiment. Moreover, FIGS. 2B and 2C illustrate embodiments of shared buffers 230 and 270 as the sizes of transmit portion 202 and the receive portion 204 are adjusted, see, e.g., the discussion of FIG. 3.

Figure 3:
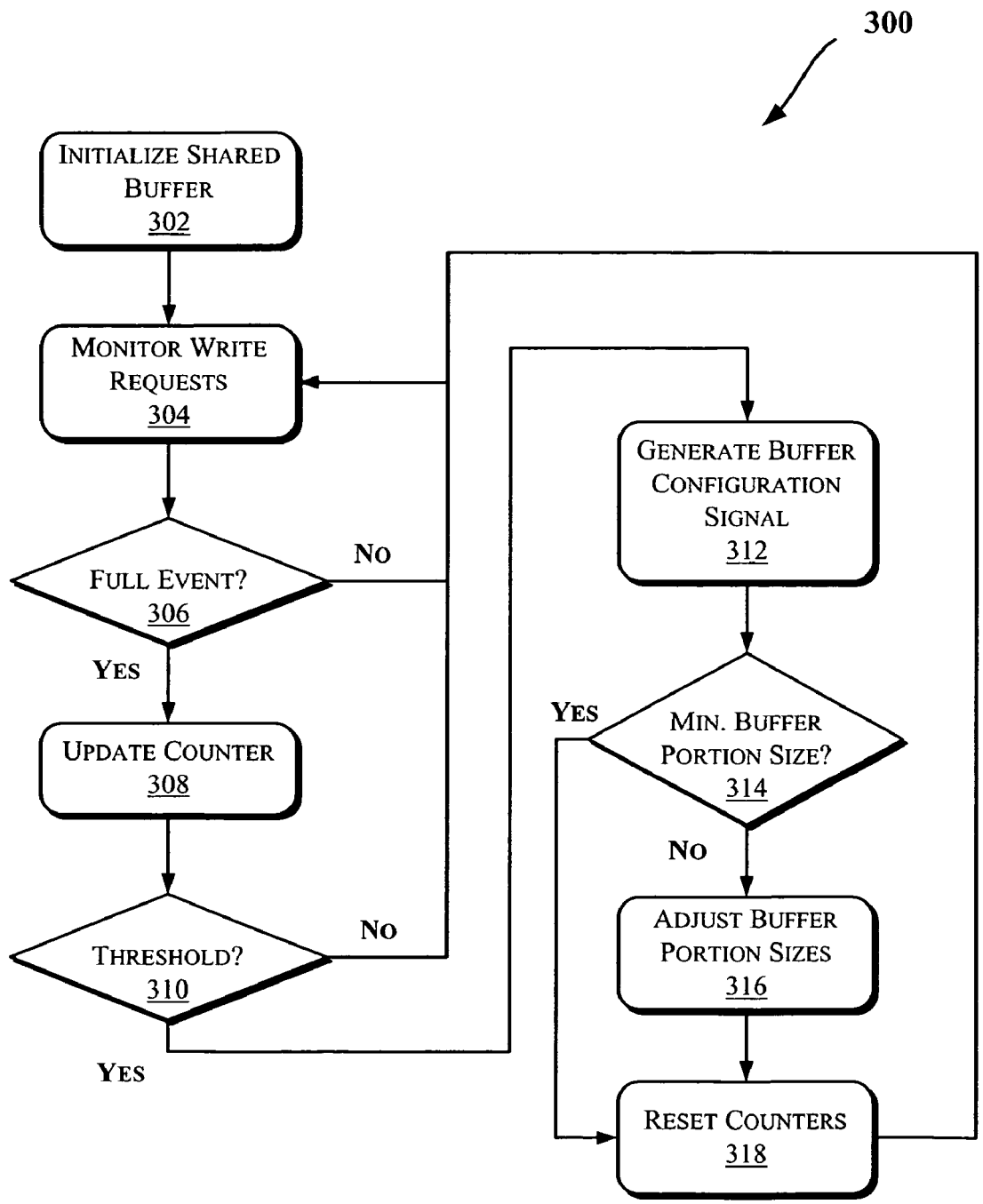
FIG. 3 illustrates a flow diagram of a method to configure a buffer, according to an embodiment.

FIG. 3 illustrates a flow diagram of a method 300 to configure a buffer, according to an embodiment. The method 300 may be performed dynamically, e.g., during runtime. Various operations discussed with reference to the method 300 may be performed by one or more components of the system 100 of FIG. 1. Various components of the systems 400, 500, and 600 of the FIGS. 4, 5, and 6 may also be utilized to perform the operations discussed with reference to the method 300.

Referring to FIGS. 1, 2A-2C, and 3, the shared buffer 124 may be initialized (302), such as discussed with reference to the buffer 200 of FIG. 2A. For example, the shared buffer 124 may be split equally between the transmit portion (202) and the receive portion (204). At an operation 304, the PMU 130 may monitor write requests to the shared buffer 124, e.g., more specifically to the transmit portion (202) and the receive portion (204). The shared buffer manager 138 may determine the occurrence of a buffer full event (306). Alternatively, the PMU 130 may determine the occurrence of a buffer full event (306), e.g., by monitoring the transactions communicated over the bus 104. At an operation 308, the PMU 130 may update (e.g., increment or decrement) the counter (e.g., 132 or 134) that corresponds to the full event of the operation 306.

At an operation 310, the PMU 130 determines if one of the counters 132 or 134 has a value that exceeds a threshold value. The threshold value of the operation 310 may be user configurable and stored in any suitable location, for example, as a variable stored in shared memory (e.g., in the memory 122) or in a hardware register. The threshold value of the operation 310 may be determined by multiplying the value stored in one of the counters 132 or 134 by a factor. For example, the value of counter 132 may be multiplied by the factor to provide the threshold value (310) which is then compared with the value stored in the other counter (134), or vice versa. The factor used to determine the threshold may be user supplied, or otherwise dynamically configurable, e.g., during runtime.

If the operation 310 determines that the threshold is not exceeded, the method 300 continues at the operation 304. Otherwise, once the threshold is reached (310), the PMU 130 generates (312) the buffer configuration signal 136. In one embodiment, smaller values of the multiplication factor at the operation 310 may provide faster triggering of the operation 312. As discussed with reference to FIG. 1, the buffer configuration signal 136 may be communicated directly to the shared buffer manager 138 or through the bus 104. In an embodiment, the buffer configuration signal 136 may implement a 2-bit signal, where the states of the 2-bit signal are utilized to indicate: (a) increase (or decrease) the size of the transmit portion 202; (b) increase (or decrease) the size of the receive portion 204; and (c) buffer portions (202, 204) may be left unchanged.

At an operation 314, the shared buffer manager 138 determines if a request communicated through the buffer configuration signal 136 may result in reducing the size of one of the transmit portion 202 or receive portion 204 below a minimum size. The minimum size of the operation 314 may be user configurable and stored in any suitable location, for example, as a variable stored in shared memory (e.g., in the memory 122) or in a hardware register. The buffer manager 138 adjusts (316) the sizes of the transmit and receive portions (202 and 204, respectively), as long as the size of the transmit and receive portions are above a minimum size (314). After the operation 316 (and if no further reduction to the portion size is allowed at the operation 314), the PMU 130 resets (318) the counters 132 and 134 (e.g., clears or initializes the counters to 0). After the operation 318, the method 300 resumes with the operation 304.

In one embodiment, the adjustment to the buffer portion sizes 202 and 204 (e.g., at operation 316) is performed without modifying the size of the shared buffer (200). This may allow for more efficient use of the resources provided on an integrated circuit that includes the system 100 of FIG. 1. Hence, a given portion of memory (e.g., shared buffer 124) may be dynamically configured to address traffic variations of a system without modifying the total size of the shared buffer itself. For example, with reference to FIGS. 2A-2C, as the transmit portion 202 fills up (while the receive portion remains less utilized), the size of the transmit portion 202 may be increased by M entries and size of the receive portion 204 reduced by M entries (see, e.g., FIG. 2B). Similarly, if the receive portion 204 is utilized more than the transmit portion 202 (e.g., causing buffer full events for the receive portion 204 as discussed with reference to the operation 310 of FIG. 3), the size of the transmit portion 202 may be decreased by P entries and size of the receive portion 204 increased by P entries (see, e.g., FIG. 2C). This may enable more efficient utilization of existing resources in the presence of asymmetrical traffic such as digital subscriber line (DSL) traffic, where downstream traffic may be significantly heavier than upstream traffic. In an embodiment, P and M may be one entry. Hence the portions 202 and 204 may be resized by one entry for each occurrence of the operation 316.

Furthermore, in an embodiment, one or more of the processor(s) 102 and/or the processor cores 106 may be programmed with instructions that when executed configure the processor to perform the operations discussed with reference to the operations 302-318, instead of or in conjunction with the components discussed above.

Figure 4:
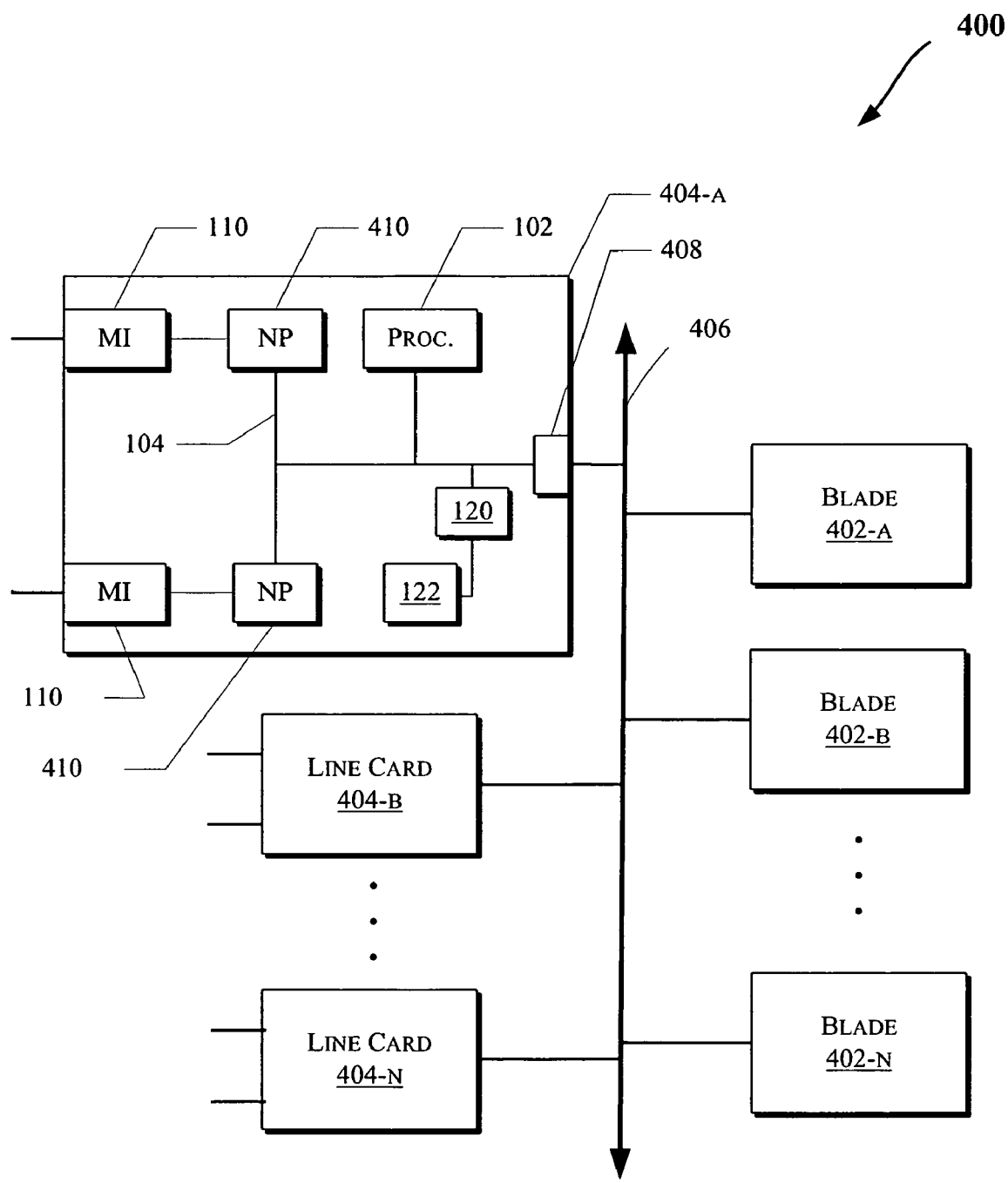
FIG. 4 illustrates an embodiment of a distributed processing platform.

The system 100 of FIG. 1 may be used in a variety of applications. In networking applications, for example, it is possible to closely couple packet processing and general purpose processing for optimal, high-throughput communication between packet processing elements of a network processor (e.g., a processor that processes data communicated over a network, for example, in form of data packets) and the control and/or content processing elements. For example, as shown in FIG. 4, an embodiment of a distributed processing platform 400 may include a collection of blades 402-A through 402-N and line cards 404-A through 404-N interconnected by a backplane 406, e.g., a switch fabric. The switch fabric, for example, may conform to common switch interface (CSIX) or other fabric technologies such as advanced switching interconnect (ASI), HyperTransport, Infiniband, peripheral component interconnect (PCI), Ethernet, Packet-Over-SONET (synchronous optical network), RapidIO, and/or Universal Test and Operations PHY (physical) Interface for asynchronous transfer mode (ATM) (UTOPIA).

In one embodiment, the line cards (404) may provide line termination and input/output (I/O) processing. The line cards (404) may include processing in the data plane (packet processing) as well as control plane processing to handle the management of policies for execution in the data plane. The blades 402-A through 402-N may include: control blades to handle control plane functions not distributed to line cards; control blades to perform system management functions such as driver enumeration, route table management, global table management, network address translation, and messaging to a control blade; applications and service blades; and/or content processing blades. The switch fabric or fabrics (406) may also reside on one or more blades. In a network infrastructure, content processing may be used to handle intensive content-based processing outside the capabilities of the standard line card functionality including voice processing, encryption offload and intrusion-detection where performance demands are high.

At least one of the line cards 404, e.g., line card 404-A, is a specialized line card that is implemented based on the architecture of system 100, to tightly couple the processing intelligence of a processor to the more specialized capabilities of a network processor (e.g., a processor that processes data communicated over a network). The line card 404-A includes media interfaces 110 to handle communications over network connections (e.g., the network 108 discussed with reference to FIG. 1). Each media interface 110 is connected to a processor, shown here as network processor (NP) 410 (which may be the processor cores 106 in an embodiment). In this implementation, one NP is used as an ingress processor and the other NP is used as an egress processor, although a single NP may also be used. Other components and interconnections in system 400 are as shown in FIG. 1. Here, the bus 104 may be coupled to the switch fabric 406 through an input/output (I/O) block 408. In an embodiment, the bus 104 may be coupled to the I/O block 408 through the memory controller 120. Alternatively, or in addition, other applications based on the multiprocessor system 100 could be employed by the distributed processing platform 400. For example, for optimized storage processing, such as applications involving an enterprise server, networked storage, offload and storage subsystems applications, the processor 410 may be implemented as an I/O processor. For still other applications, the processor 410 may be a co-processor (used as an accelerator, as an example) or a stand-alone control plane processor. Depending on the configuration of blades 402 and line cards 404, the distributed processing platform 400 may implement a switching device (e.g., switch or router), a server, a voice gateway or other type of equipment.

Figure 5:
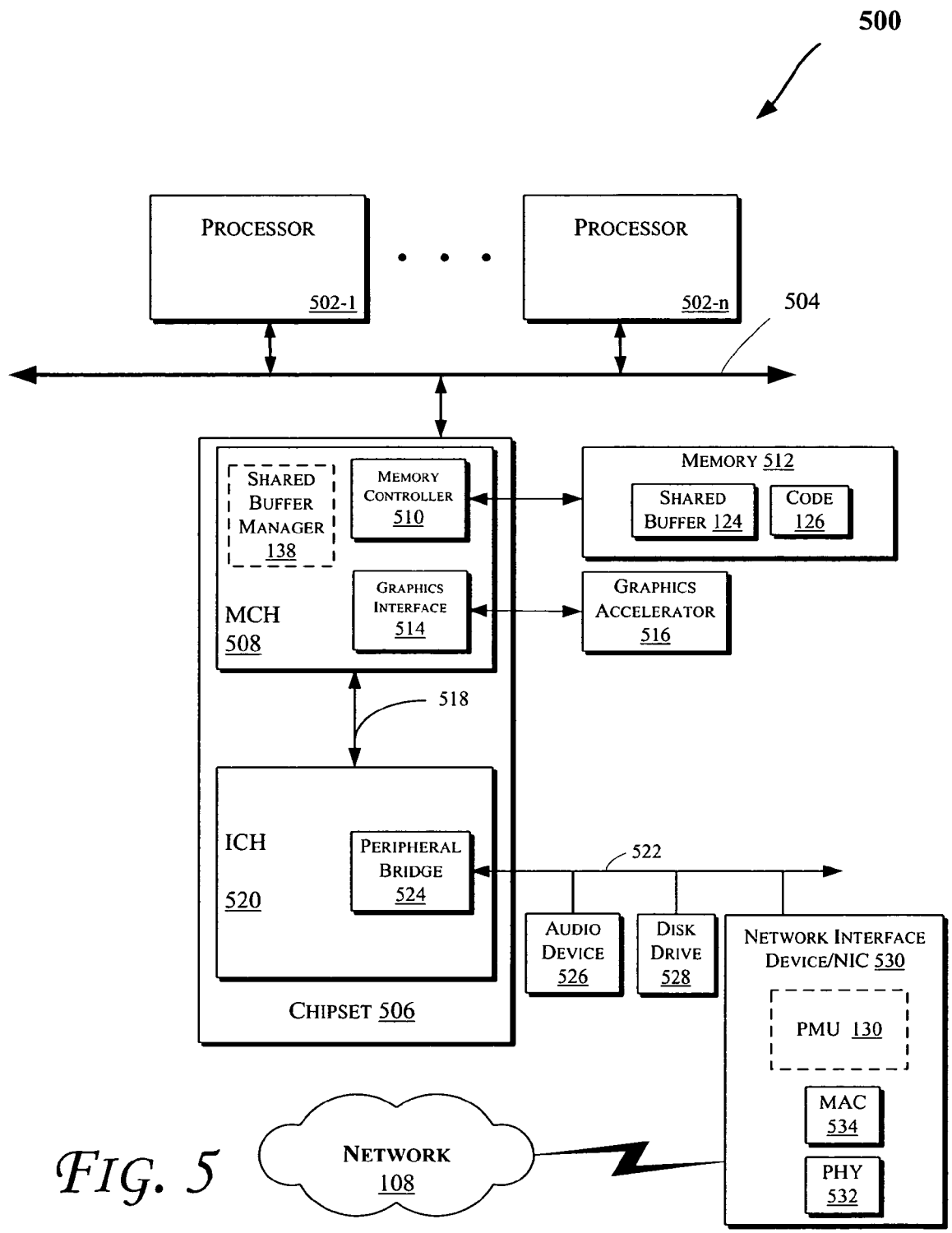
FIGS. 5 and 6 illustrate block diagrams of computing systems in accordance with various embodiments of the invention.

FIG. 5 illustrates a block diagram of a computing system 500 in accordance with an embodiment of the invention. The computing system 500 may include one or more central processing unit(s) (CPUs) 502 or processors coupled to an interconnection network (or bus) 504. The processors (502) may be any suitable processor such as a network processor (that processes data communicated over a computer network 108) or the like (including a reduced instruction set computer (RISC) processor or a complex instruction set computer (CISC)). Moreover, the processors (502) may have a single or multiple core design. The processors (502) with a multiple core design may integrate different types of processor cores on the same integrated circuit (IC) die. Also, the processors (502) with a multiple core design may be implemented as symmetrical or asymmetrical multiprocessors. Furthermore, the processor(s) 502 may optionally include one or more of the processor cores 106 and/or the processor 102. Additionally, the operations discussed with reference to FIGS. 1-4 may be performed by one or more components of the system 500.

A chipset 506 may also be coupled to the interconnection network 504. The chipset 506 may include a memory control hub (MCH) 508. The MCH 508 may include a memory controller 510 that is coupled to a memory 512. The buffer manager 138 may be implemented in any suitable location, such as within the MCH 508 (as shown in FIG. 5) or within the memory controller 510. The memory 512 may store data and sequences of instructions that are executed by the processor(s) 502, or any other device included in the computing system 500. For example, the memory 512 may store the buffer 124 and/or the code 126 discussed with reference to FIG. 1. In one embodiment of the invention, the memory 512 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may be coupled to the interconnection network 504, such as multiple CPUs and/or multiple system memories.

The MCH 508 may also include a graphics interface 514 coupled to a graphics accelerator 516. In one embodiment of the invention, the graphics interface 514 may be coupled to the graphics accelerator 516 via an accelerated graphics port (AGP). In an embodiment of the invention, a display (such as a flat panel display) may be coupled to the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may couple the MCH 508 to an input/output control hub (ICH) 520. The ICH 520 may provide an interface to I/O devices coupled to the computing system 500. The ICH 520 may be coupled to a bus 522 through a peripheral bridge (or controller) 524, such as a peripheral component interconnect (PCI) bridge, a universal serial bus (USB) controller, or the like. The bridge 524 may provide a data path between the CPU 502 and peripheral devices. Other types of topologies may be utilized. Also, multiple buses may be coupled to the ICH 520, e.g., through multiple bridges or controllers. Moreover, other peripherals coupled to the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 522 may be coupled to an audio device 526, one or more disk drive(s) 528, and a network interface device 530 (which is coupled to the computer network 108). In one embodiment, the network interface device 530 may be a network interface card (NIC). As shown in FIG. 5, the network interface device 530 may include a physical layer (PHY) 532 (e.g., to physically interface the network interface device 530 with the network 108), a media access control (MAC) 534 (e.g., to provide an interface between the PHY 532 and a portion of a data link layer of the network 108, such as a logical link control), and/or the PMU 130. As discussed with reference to FIGS. 1-3, the counters 132 and 134 (not shown in FIG. 5) may be located in any suitable location within the system 500 (for example, stored as a variable in shared memory (e.g., in the memory 512) or in a hardware register). Alternatively, software executing on the processor(s) 502 (alone or in conjunction with the PMU 130 and/or the buffer manager 138) may perform one or more of the operations discussed with reference to FIGS. 1-4. Other devices may be coupled to the bus 522. Also, various components (such as the network interface device 530) may be coupled to the MCH 508 in some embodiments of the invention. In addition, the processor 502 and the MCH 508 may be combined to form a single chip. Furthermore, the graphics accelerator 516 may be included within the MCH 508 in other embodiments of the invention.

Additionally, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media suitable for storing electronic instructions and/or data.

Figure 6:
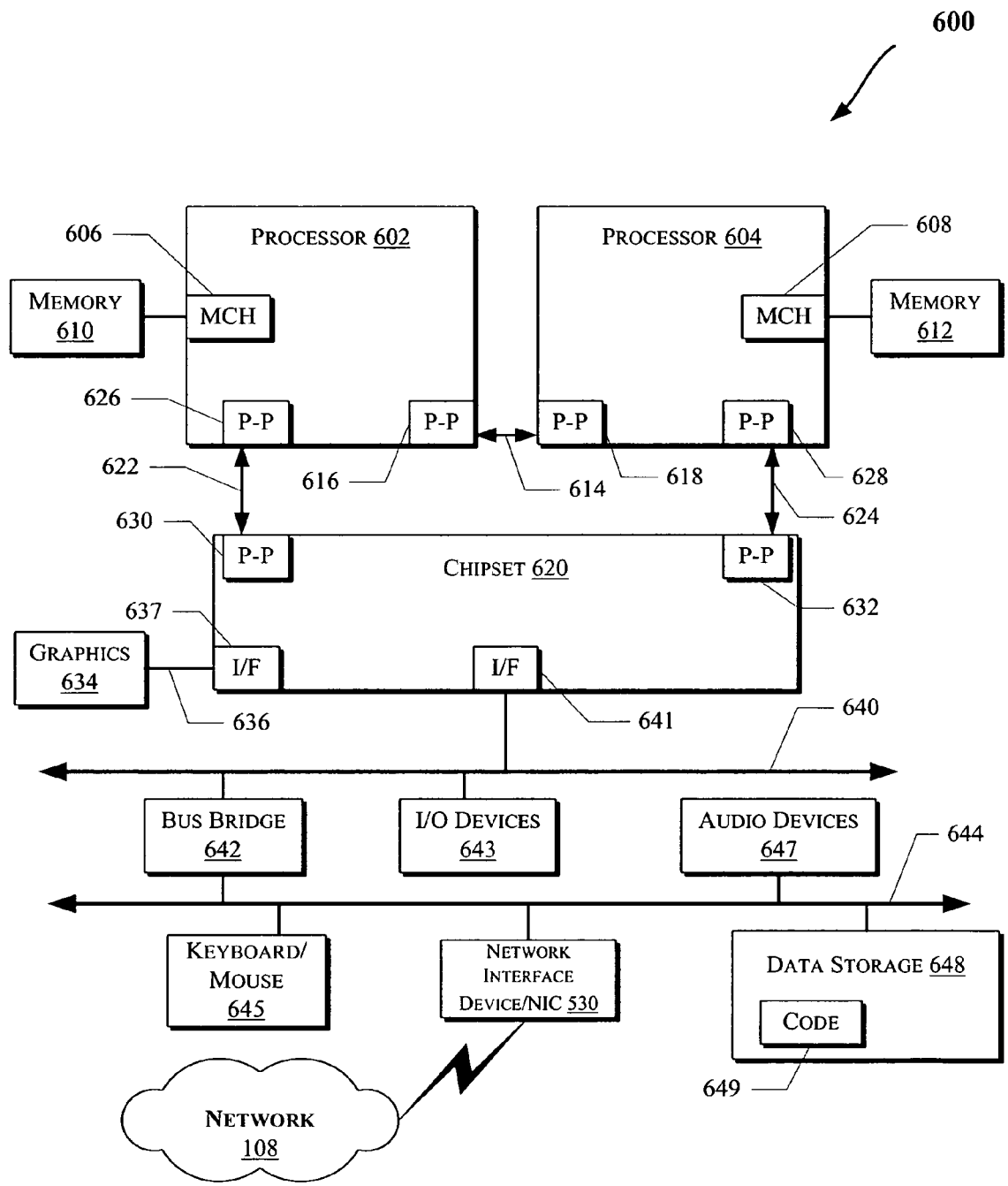

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. Optionally, the processors 602 and 604 may include the processor cores 106 and/or the processor 102 of FIG. 1 (not shown). The processors 602 and 604 may each include a local memory controller hub (MCH) 606 and 608 to couple with memories 610 and 612. The memories 610 and/or 612 may store various data such as those discussed with reference to the memories 122 and/or 512. For example, the memories 610 and/or 612 may store the buffer 124 and/or the code 126 discussed with reference to FIG. 1.

The processors 602 and 604 may be any suitable processor such as those discussed with reference to the processors 502 of FIG. 5. The processors 602 and 604 may exchange data via a point-to-point (PtP) interface 614 using PtP interface circuits 616 and 618, respectively. The processors 602 and 604 may each exchange data with a chipset 620 via individual PtP interfaces 622 and 624 using point to point interface circuits 626, 628, 630, and 632. The chipset 620 may also exchange data with a high-performance graphics circuit 634 via a high-performance graphics interface 636, using a PtP interface circuit 637.

At least one embodiment of the invention may be provided by utilizing the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may be coupled to a bus 640 using a PtP interface circuit 641. The bus 640 may have one or more devices coupled to it, such as a bus bridge 642 and I/O devices 643. Via a bus 644, the bus bridge 643 may be coupled to other devices such as a keyboard/mouse 645, the network interface device 530 discussed with reference to FIG. 5 (such as modems, network interface cards (NICs), or the like that may be coupled to the computer network 108), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any suitable storage device such as those discussed with respect to FIGS. 1, 5, and 6.

Additionally, such computer-readable media may be downloaded as a computer program product, wherein the program may be transferred from a remote computer (e.g., a server) to a requesting computer (e.g., a client) by way of data signals via a communication link (e.g. a modem or network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
   monitoring, at a performance monitor unit (PMU), write requests to a transmit portion and a receive portion of a buffer;
   adjusting, at a buffer manager, a size of the transmit portion and a size of the receive portion of the buffer based on a comparison of a threshold value, corresponding to one of the transmit portion or the receive portion, with a number of buffer full events, corresponding to a different one of the transmit portion or the receive portion, determined at the PMU, wherein the number of buffer full events corresponds to buffer full events of one of the transmit portion or the receive portion; and determining the threshold value by multiplying a value of the buffer full events by a factor.

2. The method of claim 1, wherein adjusting the sizes of the transmit and the receive portions comprises generating a buffer configuration signal.

3. The method of claim 1, wherein adjusting the sizes of the transmit and the receive portions is performed by maintaining a same size of the buffer.

4. The method of claim 1, further comprising updating one of a transmit full counter corresponding to the transmit portion or a receive full counter corresponding to the receive portion for each occurrence of the buffer full events.

5. The method of claim 1, further comprising resetting a transmit full counter corresponding to the transmit portion and a receive full counter corresponding to the receive portion if the transmit portion size and the receive portion size are adjusted.

6. The method of claim 1, wherein adjusting the sizes of the transmit and receive portions of the buffer is performed as long as the size of the transmit and receive portions are above a minimum size.

7. The method of claim 1, further comprising resetting a transmit full counter corresponding to the transmit portion and a receive full counter corresponding to the receive portion if the transmit portion size and the receive portion size are at a minimum size.

8. The method of claim 1, wherein adjusting the sizes of the transmit and the receive portions comprises one of:

reducing the size of the transmit portion by a first number of entries and increasing the size of the receive portion by the first number of entries; or increasing the size of the transmit portion by a second number of entries and increasing the size of the receive portion by the second number of entries.

9. An apparatus comprising:

logic circuitry to monitor write requests to a transmit portion and a receive portion of a buffer; and a buffer manager to adjust a size of the transmit portion and a size of the receive portion of the buffer based on a comparison of a threshold value, corresponding to one of the transmit portion or the receive portion, with a number of buffer full events, corresponding to a different one of the transmit portion or the receive portion, wherein the buffer manager is coupled to receive a signal from the logic circuitry indicating the threshold value is exceeded, wherein the number of buffer full events corresponds to buffer full events of one of the transmit portion or the receive portion and wherein the threshold value is to be determined by multiplying a value of the buffer full events by a factor.

10. The apparatus of claim 9, further comprising a transmit full counter corresponding to the transmit portion and a receive full counter corresponding to the receive portion.

11. The apparatus of claim 9, further comprising one or more hardware registers to each store one or more of a transmit full counter corresponding to the transmit portion and a receive full counter corresponding to the receive portion.

12. The apparatus of claim 9, wherein the transmit and receive portions of the buffer are contiguous.

13. The apparatus of claim 9, wherein the buffer comprises a first-in, first-out buffer.

14. The apparatus of claim 9, further comprising one or more processor cores to access data stored in the buffer.

15. The apparatus of claim 14, wherein the one or more processor cores are on a same integrated circuit die.

16. The apparatus of claim 14, wherein the one or more processor cores are processor cores of a symmetrical multiprocessor or an asymmetrical multiprocessor.

17. A storage device comprising instructions that when executed on a processor configure the processor to perform operations comprising:

monitoring, at a PMU, write requests to a transmit portion and a receive portion of a buffer;

adjusting, at a buffer manager, a size of the transmit portion and a size of the receive portion of the buffer based on a comparison of a threshold value, corresponding to one of the transmit portion or the receive portion, with a number of buffer full events, corresponding to a different one of the transmit portion or the receive portion, determined at the PMU, wherein the number of buffer full events corresponds to buffer full events of one of the transmit portion or the receive portion; and determining the threshold value by multiplying a value of the buffer full events by a factor.

18. The storage device of claim 17, wherein the operations further comprise resetting a transmit full counter corresponding to the transmit portion and a receive full counter corresponding to the receive portion if the transmit portion size and the receive portion size are adjusted.

19. A traffic management device comprising:

a switch fabric; and an apparatus, coupled to the switch fabric, to store data communicated via the switch fabric, the apparatus comprising:

logic to monitor write requests to a transmit portion and a receive portion of a buffer; and a buffer manager to adjust a size of the transmit portion and a size of the receive portion of the buffer based on a comparison of a threshold value, corresponding to one of the transmit portion or the receive portion, to a number of buffer full events, corresponding to a different one of the transmit portion or the receive portion, wherein the buffer manager is coupled to receive a signal from the logic indicating the threshold value is exceeded, wherein the number of buffer full events corresponds to buffer full events of one of the transmit portion or the receive portion and wherein the threshold value is to be determined by multiplying a value of the buffer full events by a factor.

20. The traffic management device of claim 19, wherein the switch fabric conforms to one or more of common switch interface (CSIX), advanced switching interconnect (ASI), Hyperlransport, Infiniband, peripheral component interconnect (PCI), Ethernet, Packet-Over-SONET (synchronous optical network), or Universal Test and Operations PHY (physical) Interface for ATM (UTOPIA).

21. The traffic management device of claim 19, further comprising a transmit full counter corresponding to the transmit portion and a receive full counter corresponding to the receive portion.

* * * * *

UNITED STATES PATENT AND TRADEMARK OFFICE
CERTIFICATE OF CORRECTION

PATENT NO. : 7,609,708 B2  Page 1 of 1
APPLICATION NO. : 11/243366
DATED : October 27, 2009
INVENTOR(S) : Choon Yip Soo It is certified that error appears in the above-identified patent and that said Letters Patent is hereby corrected as shown below:

In column 10, line 56, in claim 20, delete "Hyperlransport," and insert -- HyperTransport, --, therefor.

Signed and Sealed this

Ninth Day of November, 2010

David J. Kappos
*Director of the United States Patent and Trademark Office*